United States Patent
Reinhardt et al.

(10) Patent No.: US 6,683,392 B2
(45) Date of Patent: Jan. 27, 2004

(54) SWITCH MATRIX

(75) Inventors: Victor Reinhardt, Rancho Palos Verdes, CA (US); Peter Turley, Redondo Beach, CA (US); Ronald E. Sorace, Torrance, CA (US); Shih-Chang Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 158 days.

(21) Appl. No.: 09/933,337

(22) Filed: Aug. 20, 2001

(65) Prior Publication Data

US 2003/0038547 A1 Feb. 27, 2003

(51) Int. Cl.[7] ............................................. H01H 19/64
(52) U.S. Cl. ..................... 307/113; 307/147; 385/17; 370/357; 710/317
(58) Field of Search .................. 307/113, 147, 307/357; 385/17; 710/317

(56) References Cited

U.S. PATENT DOCUMENTS 5,381,096 A    1/1995  Hirzel
6,265,953 B1 * 7/2001  Romano ..................... 333/101
6,411,753 B1 * 6/2002  Ao ............................... 385/17
6,456,752 B1 * 9/2002  Dragone ....................... 385/17

* cited by examiner

Primary Examiner—Brian Sircus
Assistant Examiner—Robert L. DeBeradinis
(74) Attorney, Agent, or Firm—Terje Gudmestad

(57) ABSTRACT

A switch matrix 10 is provided comprising a plurality of input modules X and a plurality of output modules P. Each input module 16 has a plurality of first input interconnections 14, a plurality of first interconnected switches 21, and a plurality of first output interconnections 20. Each output module 18 has a plurality of second input interconnections 23, a plurality of second interconnected switches 24, and a plurality of second output interconnections 20. The plurality of input modules X is electrically coupled to the plurality of output modules P, forming a plurality of signal paths 12 having a plurality of interconnected switches K per signal path 12. A method is also provided minimizing the total number of interconnected switches Z within the switch matrix 10 for a particular application. The method comprises determining switch matrix design requirements, calculating the values of X and P, and performing an integer partitioning process.

22 Claims, 2 Drawing Sheets

SWITCH MATRIX

TECHNICAL FIELD

The present invention relates generally to a switch matrix particularly suited for satellite communication applications and more particularly, to an apparatus and method for minimizing the quantity of interconnected switches within the switch matrix.

BACKGROUND OF THE INVENTION

Various systems exist that require a large number of multi-channel configurations in which many inputs are interconnected to many outputs such as in communication systems. To satisfy this need, switching networks have been developed containing tens to thousands of interconnected switches. These switching networks include decomposing or partitioning a variable number of inputs (N) to a variable number of outputs (M). An example of this is a telephone communication network that uses non-blocking switch matrices, which allow any combination of N inputs to be connected to M outputs. A non-blocking switch is defined as one where any combination of M of N inputs can be connected to the M outputs and existing connections within the switch matrix need not be modified when a new connection is made.

A direct measure of the complexity of a switch matrix is the number of interconnecting switches required to implement the switching. In satellite communication systems and other communication systems, there is a continuing effort to decrease the quantity of the switches in a switch matrix while increasing the degree of signal isolation and redundancy of the switch matrix.

Weight is a concern for satellite communication systems. Satellite communication systems using switch matrices may be very heavy, and the weight is directly related to the size of the switch matrix. For example a switch matrix having 784 inputs and 784 outputs can weigh approximately 1000 lbs. Another reason for reducing the interconnecting switch count is to reduce the amount of hardware, electronics, power splitters, and switches within a communication system thereby lowering costs and reducing weight.

The degree of isolation in a switch matrix is related to the level of unwanted interference on a desired output signal from other disjoint inputs. In large switch matrices, the large number of disjoint signals, can cause an unacceptable amount of interference on a given signal. Each additional switch per signal path increases the isolation of the signals within a system. For example, an increase of interconnecting a single switch in a signal path increases the level of isolation by 20–40 db at microwave frequencies. Therefore, an increase in the number of switches may be desirable to improve isolation, but the corresponding increase in size and weight may be unacceptable.

Redundancy of the switch matrix corresponds to the versatility and ability, in case of a failure, to reroute a signal around the failing component. Hence, more potential signal paths for rerouting are desirable to circumvent failures. A measure of redundancy is the number of available paths K for a given number of required paths K'. The redundancy is stated as K for K', which means that K–K'+1 paths from the K paths must fail before the switch matrix is unable to route the signals. Therefore, increasing the redundancy within a switch matrix increases the reliability of the communication system. Unfortunately, improvement in redundancy corresponds to an increase in the total switch count within a switch matrix. The ability to improve the redundancy in a switch matrix by increasing K in small increments is an important advantage since the complexity as well as the reliability increases as K increases. Thus, the ability to increase K by small amounts can improve reliability while not increasing complexity.

One solution, which is fundamental to other methods in the art, is a non-blocking crossbar network. The non-blocking crossbar network has two approaches shown in FIGS. 1A and 1B. The first approach has a single pole single throw (SPST) switch at each interconnection. The second approach has two SPST switches at each interconnection.

Referring now to FIG. 1A, a conventional crossbar switch matrix having a SPST switch at each connection is shown. N input ports 1 are connected to N input circuits 2 containing 1:M power splitters 3 and M interconnect switches 4. One interconnect switch 4 of each of the N input circuits 2 is connected to the N inputs of an output circuit 5. Each of the M output circuits 5 consist of an N:1 power combiner 6.

Referring now also to FIG. 1B, a conventional crossbar switch matrix having two SPST switches per connection is shown. Each of the M output circuits 5 consists of an N:1 power combiner 6 plus N switches 7.

In both approaches, M of the N input signals is routed to the M output ports 8. The first approach has N×M SPST interconnected switches 9. The second approach has 2×N×M SPST switches 9. Although the second approach has twice the number of interconnected switches 9, it also has twice the degree of isolation between unused connections and the desired signal. The non-blocking simple crossbar switching network is applicable for broadcast mode in which a given input can be connected to any number of outputs, and non-broadcast mode in which at most one output is connected to a given input. The power splitters 3 and combiners 6 allow the same input signal (or port) 1 to be routed to multiple output ports 8. At low frequencies, the power splitters are not needed for broadcast mode.

A disadvantage of the non-blocking crossbar-switching network is that it contains the highest number of interconnected switches of existing methods known in the art. Furthermore, adding two switches in parallel doubles the complexity of the switch matrix.

Another solution decomposes an N×M switch matrix into three or more stages of interconnected smaller crossbar switch modules. As used herein, decomposition refers to a collection of signals that is partitioned and distributed among multiple switches that are interconnected. The architecture in this solution is intended for interconnected switches in which the connection of an input to a particular output is important. For networks having the same number of outputs (M) as inputs (N) and an optimum number of output modules (P), the switch count is approximately $4 \times 2^{1/2} \times N^{3/2} - 4 \times N$. The architecture of this solution has the isolation of two switches per connection when used with one switch per connection crossbar modules. Although K for K' redundancy can be achieved in small increments, a disadvantage with this architecture is that it consists of three or more stages of interconnected switches and, therefore, a large number of switches.

Yet another solution utilizes binary decimations and full broadcast. These binary architectures require $4N(\log_2(N)-1)+4M$ SPST switches using two switches per connection. One disadvantage with binary architectures is the use of 2×2 crossover switch modules, which have limited isolation because of the crossover geometry in high frequency applications. Another disadvantage is that this architecture requires doubling the switch count, to provide a preferred amount of redundancy capability.

Therefore, a need exists to reduce the size and weight of the switch matrix. Significantly decreasing the weight of a satellite communication system has the potential of saving millions of dollars in production and implementing costs.

Although a need exists to reduce the size and weight of a communication system an opposing need exists to increase the degree of isolation.

Additionally, in communication systems, a need exists to increase the number of signal paths in the switch matrix thereby increasing the redundancy capability and reliability of the communication system.

SUMMARY OF THE INVENTION

The present invention has several advantages over existing microwave switch matrix architectures. The present invention significantly decreases the number of interconnected switches required in a switch matrix over the prior art while at the same time maintaining the required number of signal paths for a particular application in which the connection of an input to a particular output is not important. The present invention, although decreasing the number of interconnected switches, also provides for increased degree of isolation and redundancy capability between signal paths within the switch matrix.

The forgoing and other advantages are provided by a switch matrix comprising a plurality of first input interconnections N, a plurality of second output interconnections M, a plurality of input modules X, and a plurality of output modules P. Each input module has a group of input interconnections selected from the plurality of first input interconnections, a plurality of first interconnected switches, and a plurality of first output interconnections. Each output module has a plurality of second input interconnections, a plurality of second interconnected switches, and a group of output interconnections selected from the plurality of second output interconnections. The plurality of first output interconnections is electrically coupled to the plurality of second input interconnections. The plurality of input modules X are electrically coupled to the plurality of output modules P, to form a plurality of signal paths having a plurality of interconnected switches K per signal path.

Additionally, a method for minimizing the number of interconnected switches Z is also provided. The method comprises determining the values of X and P and performing an integer partitioning process.

The present invention itself, together with further objects and attendant advantages, is best understood by reference to the following detailed description, with reference to the accompanying drawings.

BRIEF DESCRIPTION OF THE DRAWING

For a more complete understanding of this invention reference should now be had to the embodiment(s) illustrated in greater detail in the accompanying drawing(s) and described below by way of (an) example(s) of the invention.

In the drawings.

DETAILED DESCRIPTION OF THE PREFERRED EMBODIMENT

The present invention may be applied in various applications such as satellite communication systems, telephone networks, broadcast and non-broadcast systems, systems having multiple Location Areas (LAS), World Geodetic (WGS), Space-way-like systems, Thuraya-like systems, or other various communication systems.

Figure 1A:
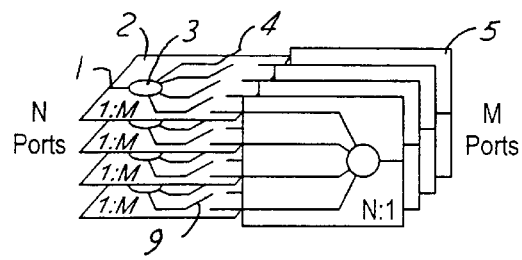
FIG. 1A is a conventional crossbar switch matrix having a single pole single throw (SPST) switch at each connection.
Figure 1B:
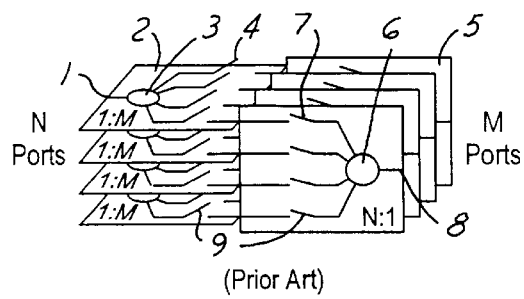
FIG. 1B is a conventional crossbar switch matrix having two SPST interconnected switches at each connection.
Figure 2:
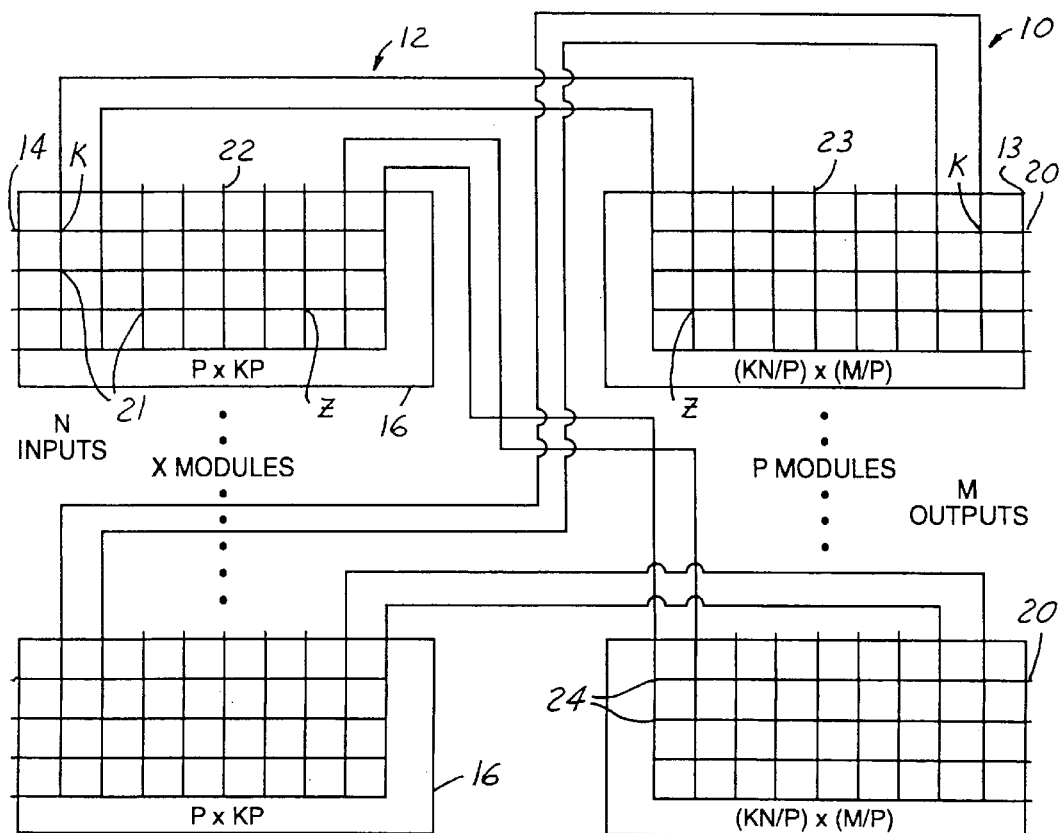
FIG. 2 is a block diagamatic view of a switch matrix in accordance with an embodiment of the present invention.

Referring now to FIG. 2, one embodiment of the present invention illustrating a switch matrix 10 is shown. The switch matrix 10 comprises a plurality of inputs N and a plurality of outputs M. The switch matrix 10 also comprises a plurality of signal paths 12. Each signal path has a first input interconnection 14, an input module 16 connected to an output module 18, and a second output interconnection 20. Each signal path 12 also has a plurality of interconnected switches K, per signal path 12, which are located within the input module 16 and the output module 18. The switch matrix 10 comprises a plurality of input modules X and a plurality of output modules P.

Each input module 16 has a plurality of first input interconnections 14 equal to P, a plurality of first interconnected switches 21 within the input module 16, and a plurality of first output interconnections 22 equal to K*P.

Each output module 18 has a plurality of second input interconnections 23 equal to K*N/P, a plurality of second interconnected switches 24 within the output module 18, and a plurality of second output interconnections 20 equal to M*P.

All of the interconnected switches located within the switch matrix 10 may be of various types and styles. The first interconnected switches 21 and the second interconnected switches 24 may be field effect transistor switches (FETs), pin diode switches, mechanical switches, relays, or other switches known in the art. The first interconnected switches 21 and the second interconnected switches 24 may also be of the type known as integrated micro relay switches used in micro electromechanical systems (MEMS). The architecture of the first interconnected switches 21 and the second interconnected switches 24 used in the present invention without active components is inherently bi-directional, so inputs and outputs of the first interconnected switches 21 and the second interconnected switches 24 may be reversed.

In the embodiment illustrated the value of N is greater than or equal to the value of M. A pair of first output interconnections 22 from each input module 16 is preferably connected to a pair of second input interconnections 23 of each output module 18. For example, if the switch matrix 10 comprised only one input module 16 having ten first output interconnections 22, the input module 16 would be connected to five output modules 18. Each output module 18 would be connected to a pair of first output interconnections 22 out of the ten first output interconnections 22. There is preferably no "doubling-up" on interconnections. In other words, any single particular first output interconnection 22 is connected to a single particular second input interconnection 23. Although, the input modules 16 and the output modules 18 of the present invention are crossbar switch modules having varying amounts of cross-connected interconnect switches, other switch modules may be used. The present invention is architecturally efficient since it is combinatorial in that the order of the connections of any subset from the input modules 16 to the output modules 18 is immaterial.

Figure 3:
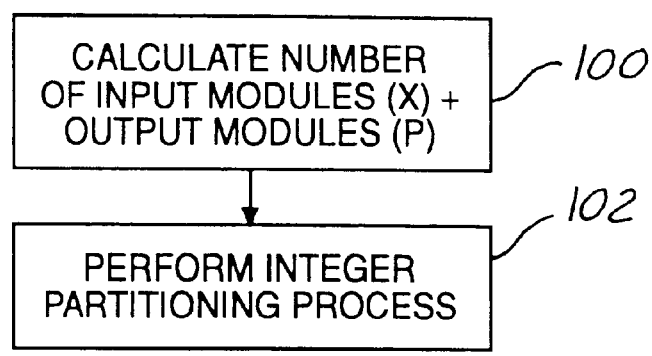
FIG. 3 is a flow chart illustrating a method, of determining the minimum number interconnected switches within a switch matrix in accordance with an embodiment of the present invention.

Referring now to FIG. 3, a logic flow diagram illustrating one example of a method for minimizing the number of first interconnected switches 21 and the second interconnected switches 24 within a switch matrix 10 for a particular application is shown. In the method shown, the minimum numbers of input modules 16 and output modules 18 are also provided for the particular application. Additionally, the present invention determines the number of first input interconnections N, first output interconnections 22, second input interconnections 23, and the second output interconnections M.

For any particular application the number of required first input interconnections N and second output interconnections M are provided. The values of N and M are based on the design requirements for the switch matrix 10 of the particular application. As known in the art, there can be an infinite number of different sized matrices using different combinations of inputs and outputs. Another consideration, based on the design requirements of the particular application, is interconnected switch count K per signal path 12. The number of interconnected switches K desired per signal path 12 is also therefore determined and is dependent upon the desired degree of isolation and the redundancy capability.

For non-broadcast applications, the minimum value of K is 1−1/P. When K is greater than 1−1/P, then 1−1/P redundancy is achieved. For broadcast applications, the minimum value of K is 2−1/P. When K is greater than 2−1/P, then 2−1/P redundancy is achieved.

In step 100, the number of output modules P is calculated based on the predetermined values of N, M, and K determined in step 1. The following expression has been derived for the non-blocking broadcast switch matrix 10:

$$Z = K*N*M^{1/2}*(y+1/y)$$

where Z represents the total number of first interconnected switches 21 and second interconnected switches 24 and:

$$y = P/M^{1/2}$$

Of course, a similar expression may be derived for applications requiring different connection combinations between input modules 16 and output modules 18 as in blocking or non-broadcast switch matrices. A relative switch count is calculated which is equal to Z divided by a truncated integer value of Z. For example if Z equaled 5.0 then the truncated integer value of Z would equal 5.

Figure 4:
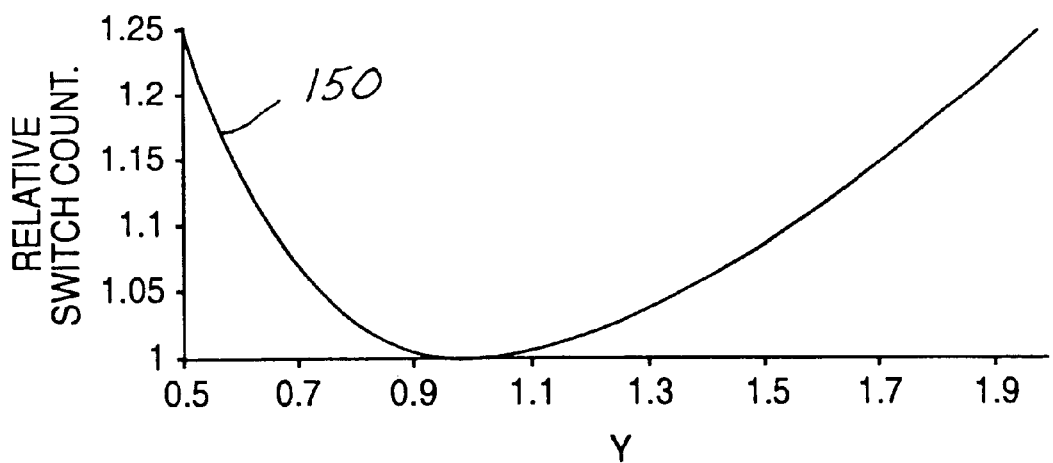
FIG. 4 is a graph of relative switch count vs. calculated value y in accordance with an embodiment of the present invention.

Referring now to FIG. 4, a curve 150 of y vs. the relative switch count is shown. Since the function y+1/y has a minimum at y equal to one, as shown in FIG. 3, and since the value of M is known, the value of P may be calculated by setting y equal to one and solving for P.

Referring again to FIG. 2, the number of input modules is calculated by the relationship:

$$X = N/P$$

In step 102, an iterative process referred to as an integer partitioning process occurs. The goal in step 104 is to find integer values for the following four expressions: K*P, N/P, M/P, and K*N/P, while keeping the value of Z as small as possible. The values of P and Z calculated in step 100, may be non-integer values. In practice however, the quantity of interconnected switches Z, first input interconnections N, second output interconnections M, input modules X, and output modules P in a switch matrix must be integer values and therefore, may differ from the calculated theoretical values.

At the beginning of the iterative process, N, M, and K are all integer values. N, M, and K should preferably remain integer values throughout the integer partitioning process but may be adjusted. In the integer partitioning process the order by which integer values are determined for different component parts of a switch matrix may vary depending on calculation ease, efficiency, and designer satisfaction.

The P value calculated in step 100 which represents the theoretical minimum total number of output modules P in the switch matrix 10 is adjusted. If the value of P is not an integer value then the value of P is rounded up to the next closest integer value. For example if P equaled 5.4 then P is rounded to 6.0.

The next variable that is adjusted is Z, which represents the minimum total number of interconnected switches 21 needed in the switch matrix. This term is adjusted in the same fashion as P previously described.

After integer values for all the variables representing component parts within the switch matrix are determined, integer values for the four above expressions are determined. If the plurality of input modules X, the plurality of first output interconnections 22, the plurality of second input interconnections 23, and the plurality of second output interconnections 20 which are represented by N/P, K*P, K*N/P, and M/P, respectively, are not integer values, they are adjusted to be integer values. The four expressions are adjusted, if necessary, in no particular order.

The value of N, M, K, and P may be adjusted to allow N/P, K*P, K*N/P, and M/P to be integer values which is why this process is sometimes iterative. Throughout this process the goal is to have a minimum value for Z. Note that although throughout this process the total switch count is increasing, it is increasing by a relatively small number. Referring again to FIG. 3, as y increases from 0.5 to 2.0 the relative switch count only changes by approximately 25%.

In Table 1:

TABLE 1

Comparison of Invention Switch Count with Prior Art

| | | | HSC MSM Parameters | | | | | | HSC Switch Count | Best Prior Architecture | | |
|---|---|---|---|---|---|---|---|---|---|---|---|---|
| N | M | Broad-cast? | K | N' | M' | P | N'/P | M'/P | | Switch Count | Ratio Prior/HSC | Prior Type |
| 400 | 40 | N | 1 | 400 | 40 | 5 | 80 | 8 | 5200 | 9690 | 1.9 | Clos |
| 100 | 40 | Y | 2 | 100 | 40 | 5 | 20 | 8 | 2600 | 3232 | 1.2 | Binary |
| 750 | 49 | N | 1 | 750 | 50 | 5 | 150 | 10 | 11250 | 20008 | 1.8 | Clos |
| 750 | 8 | N | 1 | 752 | 8 | 4 | 188 | 2 | 4512 | 6803 | 1.5 | Clos |

Note:
Based on 2 Switches per Connection & No Redundancy a comparison of the total switch counts, for different switch matrices having different input and output design requirements, for the present invention and the prior art are shown. Also the table shows the integer partitioning of the present invention for the different switch matrices. The present invention in every case has a much lower total switch count as compared to the prior art. The apostrophe (') in front of certain variables in the table signifies typical integer values that satisfy the design requirements of the particular communication system represented in the integer value row. The values in the table are not theoretical minimum values. Using the example of a 750 input×49 output non-broadcast switch matrix, the theoretical switch count is 10,500, while the actual minimum, due to the requirements of integer partitioning is 11,250. The increase in switch count between the theoretical value and the actual value is only 7%. In contrast, an equivalent capacity prior art switch matrix would require 20,008 interconnect switches.

The constructed embodiment in combination with the above described method of the present invention therefore minimizes the number of interconnect switches within a switch matrix while at the same time providing the desired degree of isolation and redundancy capability. The present invention, by significantly reducing the number of interconnect switches over the prior art, reduces the weight of a switch matrix by as much as 67% and reduces the costs involved in production and implementation of a communication system.

The above-described apparatus and manufacturing method, to one skilled in the art, is capable of being adapted for various purposes and is not limited to the following applications: satellite communication systems, phone networks, broadcast and non-broadcast systems, systems having multiple Location Areas (LAS), World Geodetic (WGS), Space-way-like systems, Thuraya-like systems, or other various communication systems. The above-described invention can also be varied without deviating from the true scope of the invention.

While particular embodiments of the invention have been shown and described, numerous variations alternate embodiments will occur to those skilled in the art. Accordingly, it is intended that the invention be limited only in terms of the appended claims.

What is claimed is:

1. A switch matrix comprising:
   a plurality of first input interconnections (N);
   a plurality of second output interconnections (M);
   a plurality of input modules (X) wherein each input module comprises a group of input interconnections selected from said plurality of first input interconnections (N), a first plurality of interconnected switches, and a plurality of first output interconnections, wherein the sum of the input interconnections in said groups of input interconnections is equal to the total number of first input interconnections (N);
   a plurality of output modules (P), wherein each output module comprises a plurality of second input interconnections, a second plurality of interconnected switches, and a group of output interconnections selected from said plurality of second output interconnections, wherein the sum of the output interconnections in said groups of output interconnections is equal to the total number of second output interconnections (M);
   wherein said plurality of first output interconnections is electrically coupled to said plurality of second input interconnections;
   wherein said plurality of input modules (X) are electrically coupled to said plurality of output modules (P), to form a plurality of signal paths having a plurality of interconnected switches (K) per signal path.

2. A system as in claim 1 wherein the number of output modules (P) is equal to the plurality of first input interconnections (N) divided by said plurality of input modules (X).

3. A system as in claim 1 wherein each input module (X) uses an equal number of input interconnections.

4. A system as in claim 1 wherein the number of input interconnections in each group of input interconnections is equal to the number of output modules (P).

5. A system as in claim 1 wherein each input module (X) is electrically coupled to all output modules (P).

6. A system as in claim 1 wherein each plurality of first output interconnections is equal to K*P.

7. A system as in claim 1 wherein the number of output interconnections in each output module is equal to said plurality of second output interconnections (M) divided by said plurality of output modules (P).

8. A system as in claim 1 wherein said first interconnected switches of each of said input modules (X) comprises switches selected from the group comprising: field effect transistor switches, pin diode switches, piezoelectric switches, ferrite switches, and mechanical switches.

9. A system as in claim 1 wherein said second interconnected switches of each of said output modules (P) comprises switches selected from the group comprising: field effect transistor switches, pin diode switches, piezoelectric switches, ferrite switches, and mechanical switches.

10. A system as in claim 1 wherein said plurality of input module (X) and said plurality of output module (P) are mounted on a plurality of respective circuit boards.

11. A system as in claim 1 wherein said first interconnected switches of each of said input modules (X) are bi-directional.

12. A system as in claim 1 wherein said second interconnected switches of each of said output modules (P) are bi-directional.

13. A system as in claim 1 wherein the values of said N, said M, said K, said P, K*P, K*N/P, N/P, and M/P are each an integer value.

14. A system as in claim 13 wherein the value of said P multiplied by the value of said K*P is an integer value.

15. A system as in claim 13 wherein the value of said K*N/P multiplied by the value of said M/P is an integer value.

16. A system as in claim 1 wherein each plurality of second input interconnections is equal to K*N/P.

17. A method of minimizing the total number of interconnected switches (Z) within a switch matrix having a plurality of first input interconnections (N), a plurality of input modules (X), a plurality of output modules (P), and a plurality of second output interconnections (M) comprising the steps of:

determining the values of P and X; and performing an integer partitioning process.

18. A method according to claim 17 further comprising:

providing a desired degree of isolation;

providing a desired redundancy capability; and providing a quantity of interconnected switches (K) per signal path as a function of said degree of isolation and said redundancy capability.

19. A method as in claim 17 wherein the step of determining the value of P comprises determining the value of P as a function of a constant value y and the value of M.

20. A method as in claim 17 wherein the step of determining the value of X comprises determining the value of X as a function of the values of N and P.

21. A method as in claim 17 wherein the step of calculating the value of X further comprises using a mathematical relationship, the value of N, and the value of P to calculate for X.

22. A method as in claim 17 wherein the step of performing integer partitioning comprises determining integer values for the quantity of: interconnected switches, switch matrix interconnections, input modules, and output modules.

* * * * *